US011399078B1

(12) United States Patent
Jing et al.

(10) Patent No.: US 11,399,078 B1
(45) Date of Patent: Jul. 26, 2022

(54) REQUEST HANDLING WITH AUTOMATIC SCHEDULING

(71) Applicant: VMware, Inc., Palo Alto, CA (US)

(72) Inventors: Chen Jing, Shanghai (CN); Jin Feng, Shanghai (CN); Sifan Liu, Shanghai (CN); Yu Wu, Shanghai (CN); Jiushi Wan, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/232,132

(22) Filed: Apr. 15, 2021

(51) Int. Cl.
  *G06F 9/455* (2018.01)
  *H04L 67/60* (2022.01)
(52) U.S. Cl.
  CPC .................................. *H04L 67/32* (2013.01)
(58) Field of Classification Search
  None
  See application file for complete search history.

(56) References Cited

U.S. PATENT DOCUMENTS

| | | | |
|---|---|---|---|
| 9,817,698 B2 * | 11/2017 | He | G06F 9/50 |
| 10,042,659 B1 * | 8/2018 | Gupta | G06F 1/32 |
| 2019/0266534 A1 * | 8/2019 | Kessaci | G06F 9/5077 |

* cited by examiner

Primary Examiner — Natisha D Cox
(74) Attorney, Agent, or Firm — Su IP Consulting

(57) ABSTRACT

Example methods and systems for request handling with automatic scheduling are described. In one example, a computer system may receive, from multiple client devices, respective multiple requests that are generated and sent according to a first set of control parameters. Based on the multiple requests, request characteristic(s) may be monitored to determine whether an automatic scheduling condition is satisfied. In response to determination that the automatic scheduling condition is satisfied, the computer system may assign a second set of control parameters to the respective client devices and instruct the client devices to generate and send respective multiple subsequent requests according to the second set of control parameters to cause a modification of the request characteristic(s).

21 Claims, 8 Drawing Sheets

US 11,399,078 B1

REQUEST HANDLING WITH AUTOMATIC SCHEDULING

BACKGROUND

Virtualization allows the abstraction and pooling of hardware resources to support virtual machines in a software-defined network (SDN) environment, such as a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, server(s) may be deployed in the SDDC to handle incoming request packets from various client devices. It is desirable to implement request handling in a more efficient manner.

DETAILED DESCRIPTION

Figure 1:
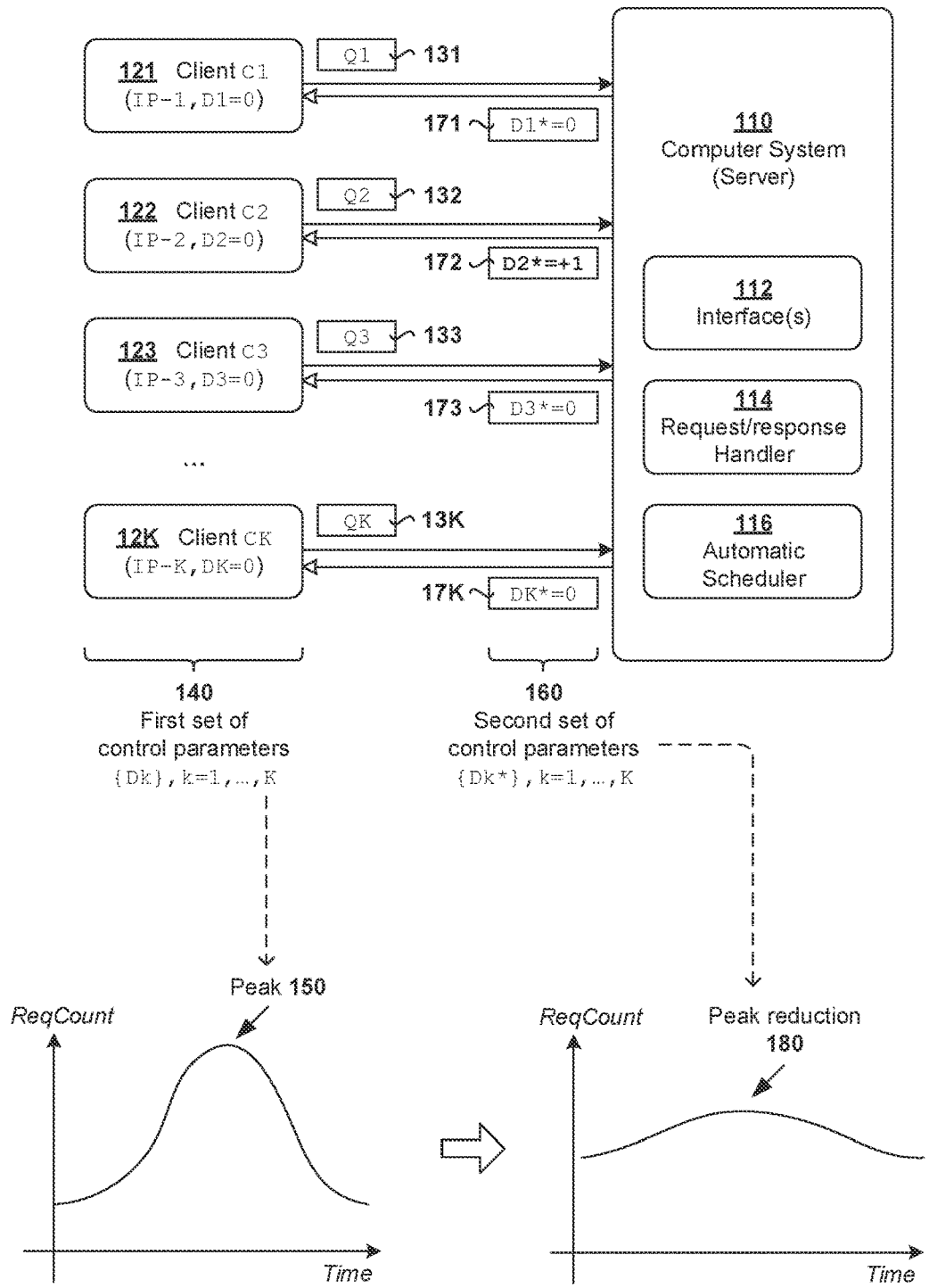
FIG. 1 is a schematic diagram illustrating an example network environment in which request handling with automatic scheduling may be performed.

According to examples of the present disclosure, request handling with automatic scheduling may be implemented to reduce the likelihood of server overloading and improve performance. One example may include a computer system (see server 110 in FIG. 1) receiving, from multiple client devices (see 121-12K), respective multiple requests (see 131-13K) that are generated and sent according to a first set of control parameters (see 140). Based on the multiple requests, request characteristic(s) may be monitored to determine whether an automatic scheduling condition is satisfied. If yes (i.e., condition satisfied), a second set of control parameters (see 160) may be assigned to the respective client devices. Further, the client devices may be instructed to generate and send respective multiple subsequent requests according to the second set of control parameters. This is to cause a modification of the request characteristic(s) monitored by the computer, such as a reduction of the peak number of received requests and/or variance of number of requests (see 150, 180).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Throughout the present disclosure, it should be understood that although the terms "first" and "second" are used to describe various elements, these elements should not be limited by these terms. These terms are used to distinguish one element from another. A first element may be referred to as a second element, and vice versa.

FIG. 1 is a schematic diagram illustrating example network environment 100 in which request handling with automatic scheduling may be performed. It should be understood that network environment 100 may include additional and/or alternative components than that shown in FIG. 1. In this example, network environment 100 may include server 110 ("computer system") capable of handling requests from multiple (K) client devices denoted as 121-12K. After handling or processing the requests, server 110 may generate and send responses to respective client devices 121-12K.

Depending on the desired implementation, the example in FIG. 1 may be implemented for any suitable application(s), such as software component update, database update, packet processing, etc. In a first example, client devices 121-12K may each implement a software component that requires an update from time to time, such as a software patch for fixing security vulnerabilities or bugs in the software component. In this case, server 110 may receive a burst or spike of requests from client devices 121-12K to download the latest software patch within a period of time. In practice, server 110 and client devices 121-12K may be part of a software distribution network.

In a second example, client devices 121-12K may each be a management entity (e.g., VMware vCenter Server®) associated with a distributed storage system, such as virtual storage area network (e.g., VMware vSAN™), etc. In general, to form a distributed storage system, multiple physical hosts may aggregate storage resources (e.g., storage disks) to form a shared pool of storage. In this case, server 110 may maintain a hardware compatibility list (HCL) database specifying hardware devices that are compatible with the distributed storage system, such as controller, solid-state drive (SSD), hard disk drive (HDD), physical network interface controller (PNIC), etc.

The HCL database maintained by server 110 is generally updated periodically, such as multiple times a week or month, etc. In this case, client devices 121-12K may each implement a health service component (e.g., daemon thread) to interact with server 110 and check for any update to the HCL database, such as by accessing a uniform resource locator (URL), etc. If there has been an update, client devices 121-12K may each request server 110 for any update to the HCL database. This way, client devices 121-12K may perform any necessary validation on physical hosts forming the distributed storage system.

Physical Implementation View

Figure 2:
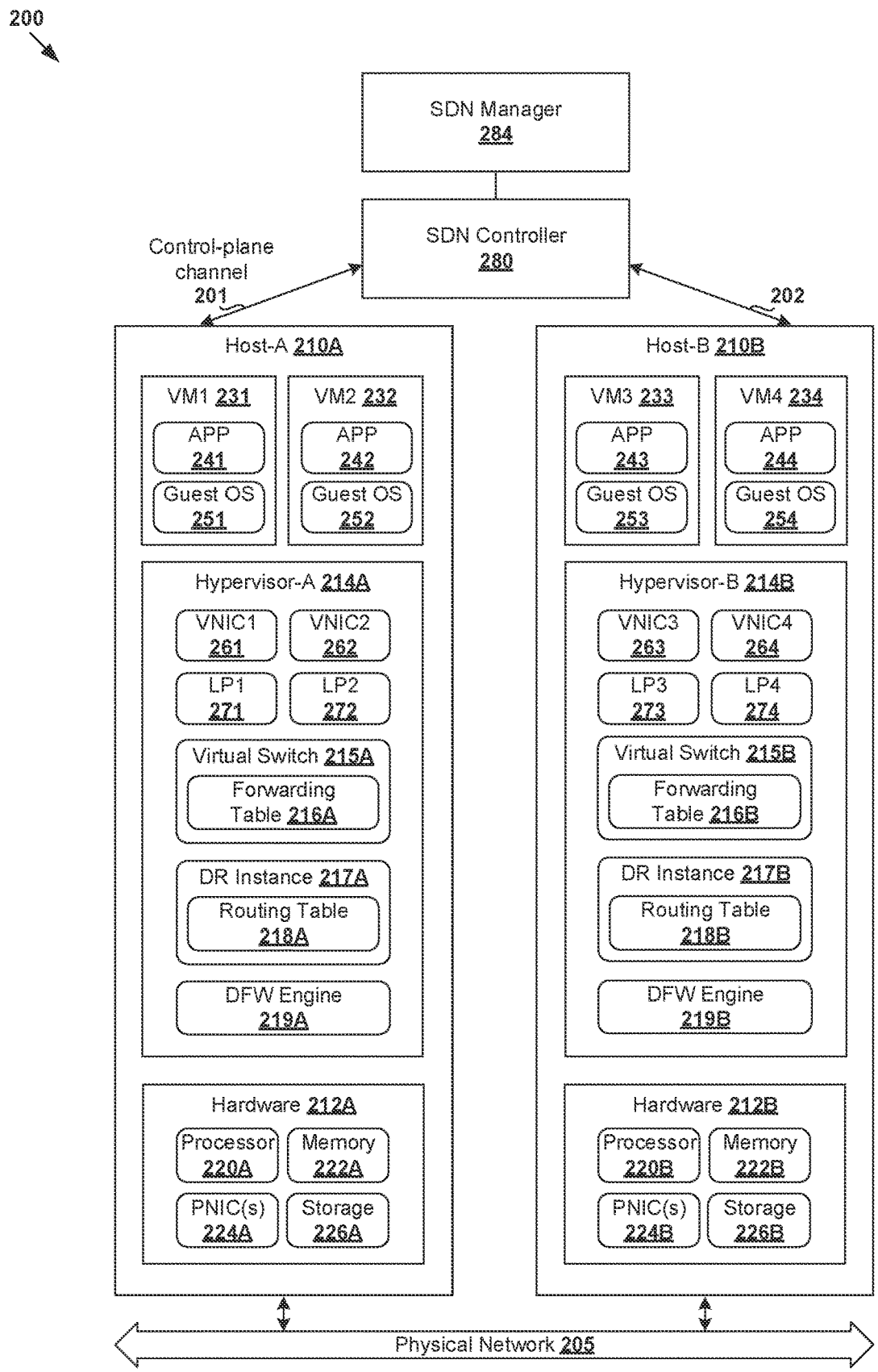
FIG. 2 is a schematic diagram illustrating an example physical implementation view of a software-defined networking (SDN) environment.

Referring also to FIG. 2, computer system 110 and/or client devices 121-12K may each be implemented using physical (bare metal) machines and/or virtual machines (VMs). Some example VMs are shown in FIG. 2, which is a schematic diagram illustrating an example physical implementation view of software-defined networking (SDN) environment 200. Here, SDN environment 200 may include various hosts 210A-B (two shown for simplicity). Each host 210A/210B may include suitable hardware 212A/212B and virtualization software (e.g., hypervisor 214A/214B) to support VMs 231-234. Hardware 212A/212B includes suitable physical components, such as central processing unit(s) (CPU(s)) or processor(s) 220A/220B; memory 222A/222B; PNIC(s) 224A/224B; and storage disk(s) 226A/226B, etc.

Hypervisor 214A/214B maintains a mapping between underlying hardware 212A/212B and virtual resources allocated to respective VMs. Virtual resources are allocated to respective VMs 231-234 to support a guest operating system (OS; not shown for simplicity) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

SDN controller 280 and SDN manager 284 are example management entities in network environment 100. One example of an SDN controller is the NSX controller component of VMware NSX® (available from VMware, Inc.) that operates on a central control plane (see module 282). SDN controller 280 may be a member of a controller cluster (not shown for simplicity) that is configurable using SDN manager 284. Management entity 280/284 may be implemented using physical machine(s), VM(s), or both. To send or receive control information, a local control plane (LCP) agent (not shown) on host 210A/210B may interact with SDN controller 280 via control-plane channel 201/202.

Through virtualization of networking services in network environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, corresponding VMs. In Network environment 100, logical switches and logical DRs may be implemented in a distributed manner and can span multiple hosts. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables 218A-B at respective DR instances 217A-B. Routing tables 218A-B may each include entries that collectively implement the respective logical DRs (to be discussed further below).

Packets may be received from, or sent to, each VM via an associated logical port. For example, logical switch ports 271-274 are associated with respective VMs 231-234. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Hosts 210A-B may also maintain data-plane connectivity with each other via physical network 205 to facilitate communication among VMs 231-234. Hypervisor 214A/214B may each implement virtual tunnel endpoint (VTEP) to encapsulate and decapsulate packets with an outer header (also known as a tunnel header) identifying the relevant logical overlay network (e.g., VNI). Any suitable tunneling protocol, such as Virtual eXtensible Local Area Network (VXLAN), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer-2 physical networks.

To protect VMs 231-234 against potential security threats, hypervisor 214A/114B may implement distributed firewall (DFW) engine 219A/219B to filter packets to and from associated VMs 231-234. For example, at host-A 210A, hypervisor 214A implements DFW engine 219A to filter packets for VM1 231 and VM2 232. SDN controller 280 may be used to configure firewall rules that are enforceable by DFW engine 219A/119B. Packets may be filtered according to firewall rules at any point along the datapath from a source (e.g., VM1 231) to a physical NIC (e.g., 224A). In one embodiment, a filter component (not shown) may be incorporated into each VNIC 241-244 to enforce firewall rules configured for respective VMs 231-234. The filter components may be maintained by respective DFW engines 219A-B.

Request Handling with Automatic Scheduling

Figure 3:
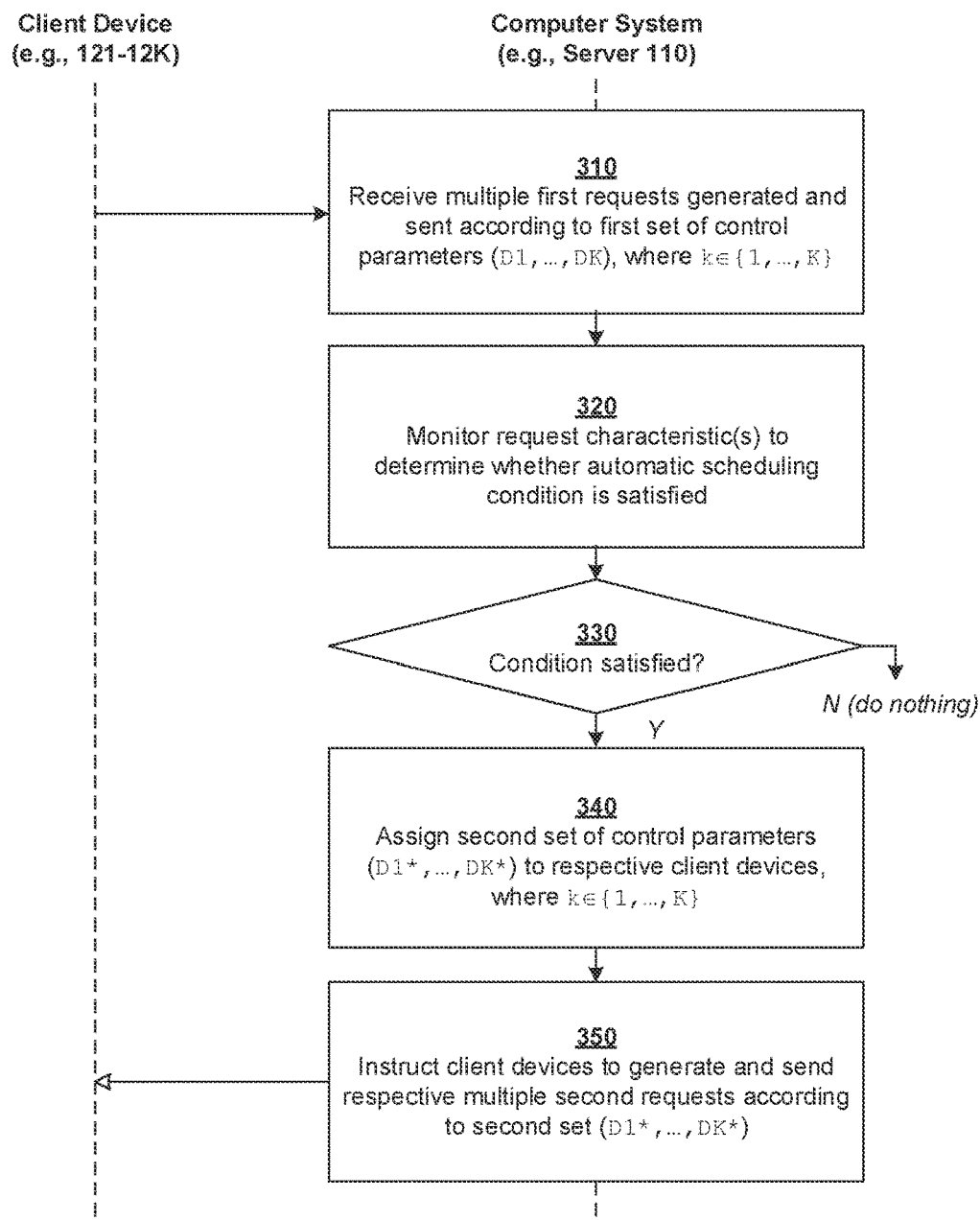
FIG. 3 is a flowchart of an example process for a computer system to perform request handling with automatic scheduling.

According to examples of the present disclosure, request handling may be implemented in an improved manner using automatic scheduling. In more detail, FIG. 3 is a flowchart of example process 300 for a computer system to perform request handling with automatic scheduling in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation.

Examples of the present disclosure may be implemented using any suitable "computer system," such as server 110 capable of handling requests from multiple client devices 121-12K in FIG. 1. Depending on the desired implementation, server 110 may include interface 112 to interact with client devices 121-12K, such as application programming interface (API), command line interface (CLI), graphical user interface (GUI), etc. Server 110 may further include request/response handler 114 to handle incoming requests and generate outgoing responses, and automatic scheduler 116 to facilitate request handling with automatic scheduling according to examples of the present disclosure. FIG. 3 will be explained using FIG. 1 below.

At 310 in FIG. 3, server 110 may receive, from multiple (K) client devices 121-12K, respective multiple requests (see 131-13K in FIG. 1) that are generated and sent according to a first set of control parameters (see 140 in FIG. 1). For example, the first set may be denoted as {Dk}, where k∈{1, . . . , K} is associated with the $k^{th}$ client device and K is the number of client devices. As used herein, the term "request" from a client device may refer generally to a packet in any suitable format to obtain information or service(s) from server 110, such as software update request, database update request, packet processing request, etc.

At 320 in FIG. 3, based on multiple requests 131-13K, server 110 may monitor request characteristic(s) to determine whether an automatic scheduling condition is satisfied. As used herein, the term "request characteristic" may refer generally to any suitable attribute information that is derivable from requests received by server 110. Example request characteristics may include: (a) a variance of number of requests received over a period of time; (b) an average number of requests received over a period of time and (c) a peak number of requests received over a period of time (e.g., multiple time slots of an update cycle). See example peak 150 in FIG. 1.

At 330-340 in FIG. 3, in response to determination that the automatic scheduling condition is satisfied, server 110 may assign a second set of control parameters (see 160 in FIG. 1) to respective client devices 121-12K. For example in FIG. 1, the second set may be denoted as {Dk*}, where Dk* denotes the control parameter assigned to the $k^{th}$ client device during automatic scheduling, k∈{1, . . . , K} and K is the number of client devices.

In practice, Dk* (also referred to as "delta") may be a time-based parameter to cause the $k^{th}$ client device to generate and send a subsequent request at an earlier time slot, or a later time slot. Using k=2 as an example in FIG. 1, the first set may include a "first control parameter" in the form of D2=0 assigned to particular client device 122 (labelled C2). In this case, the second set may include a "second control parameter" in the form of D2*=+1, which is assigned to particular client device 122 and different from the first control parameter (i.e., D2*≠D2).

Depending on the desired implementation, a positive value for Dk* (i.e., Dk*>0) may be assigned to cause the $k^{th}$ client device to increase a sleep time of a daemon (e.g., software update component) to generate and send a subsequent request at a later time slot. In contrast, a negative value for Dk* (i.e., Dk*<0) may be assigned to cause a decrease of the sleep time to generate and send a subsequent request at an earlier time slot. A zero value for Dk* (i.e., Dk*=0) may be assigned to maintain the same sleep time and time slot. As will be explained below, the "earlier time slot" and "later time slot" may be defined in relation to a "reference time slot," such as the start of a subsequent software update cycle.

At 350 in FIG. 3, server 110 may instruct (see 171-17K in FIG. 1) client devices 121-12K to generate and send respective multiple subsequent requests according to the second set of control parameters. This is to cause a modification of the request characteristic(s) monitored by server 110 at block 320, such as a reduction of the variance of number of requests and/or a reduction of the peak number of requests. For example in FIG. 1, the peak demand prior to automatic scheduling (see 150) may be reduced (see 180) after automatic scheduling.

Examples of the present disclosure should be contrasted against conventional approaches that necessitate the computer system to scale up in order to handle the spikes of requests. In practice, a server-side auto-scaling function may be expensive to implement in order to allocate more resources (e.g., memory and processing power) to request handling. Also, in a deployment with a large number of workloads, the auto-scaling function at one workload might deprive other workload(s) from precious resources to run more important applications. Further, auto-scaling may not be entirely effective because it is impossible for the scale up to be infinitely large. Another conventional approach necessitates a server pushing a notification to a client device whenever an update is available and let the client device to choose a time for update. However, this cannot ensure no spike of requests, especially when a large number of client devices select the same time slot. In this case, the spike is usually tolerated rather than reduced, which is undesirable and affect performance.

As will be described further below, examples of the present disclosure may be implemented to reduce the likelihood of unexpected spikes of requests, which may lead to overloading and performance degradation at server 110. Using a client-side approach, the control parameters may be assigned to instruct client devices to modify their behavior when generating and sending subsequent requests to server 110 to improve the overall request handling performance. This way, each client device may be instructed or configured to contribute to the modification of request characteristic(s), such as to reduce variance of number of requests over a period of time, peak number of requests over a period of time, etc. In the following, various examples will be discussed using FIGS. 4-8 with reference to a time-insensitive software update scenario.

Example: Time-Insensitive Software Update

Figure 4:
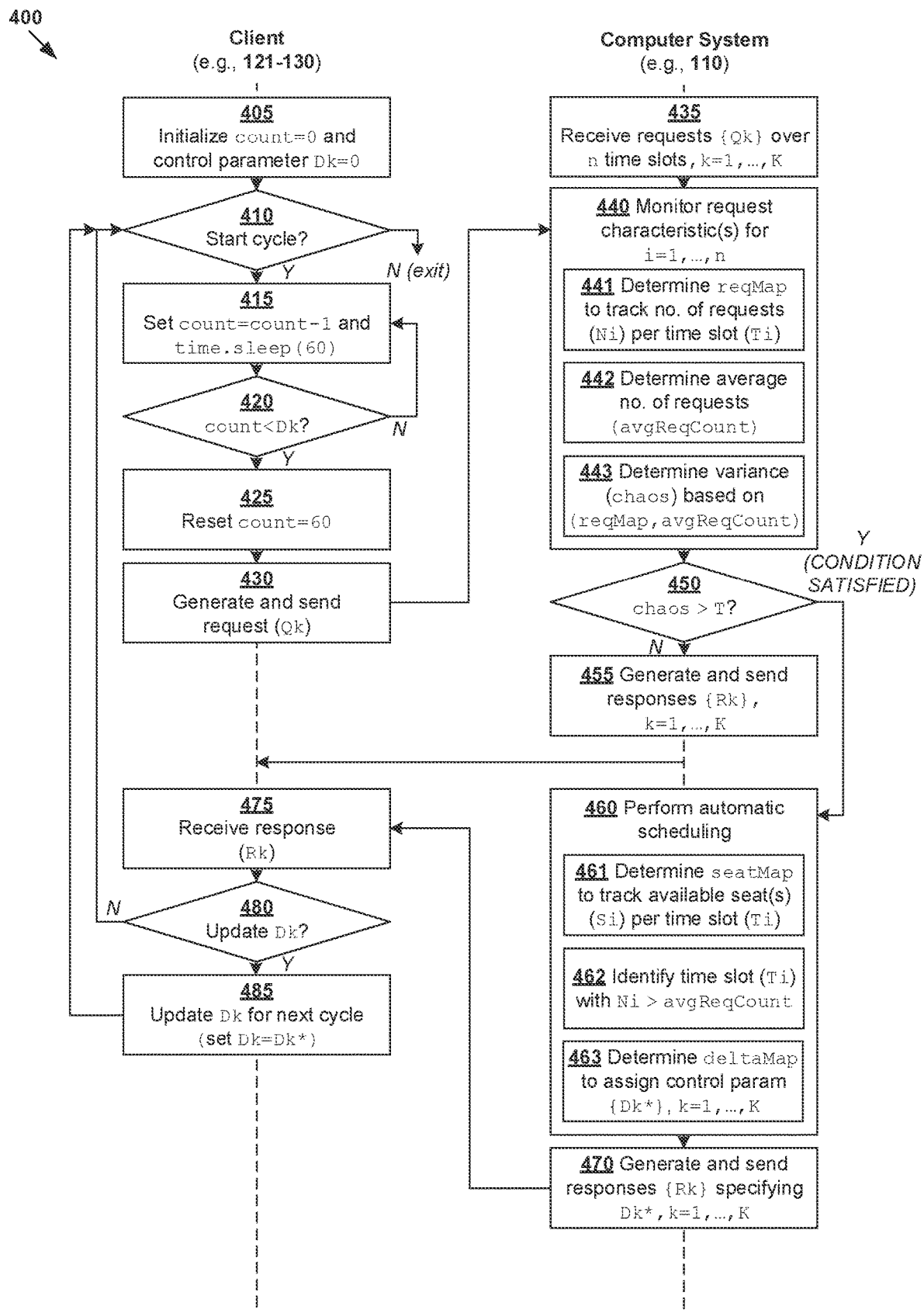
FIG. 4 is a flowchart of an example detailed process for request handling with automatic scheduling.
Figure 5:
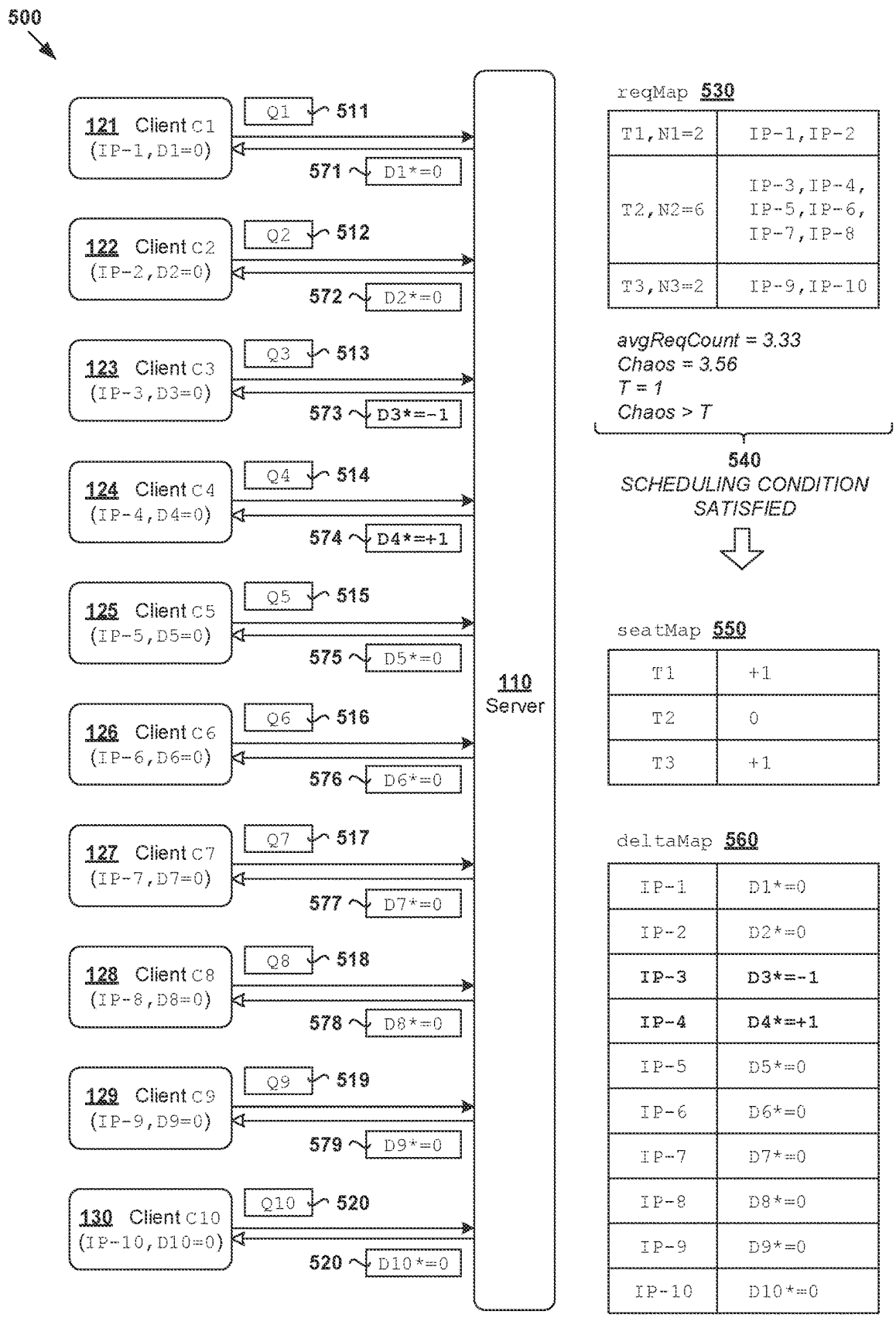
FIG. 5 is a schematic diagram illustrating first example of request handling with automatic scheduling.
Figure 6:
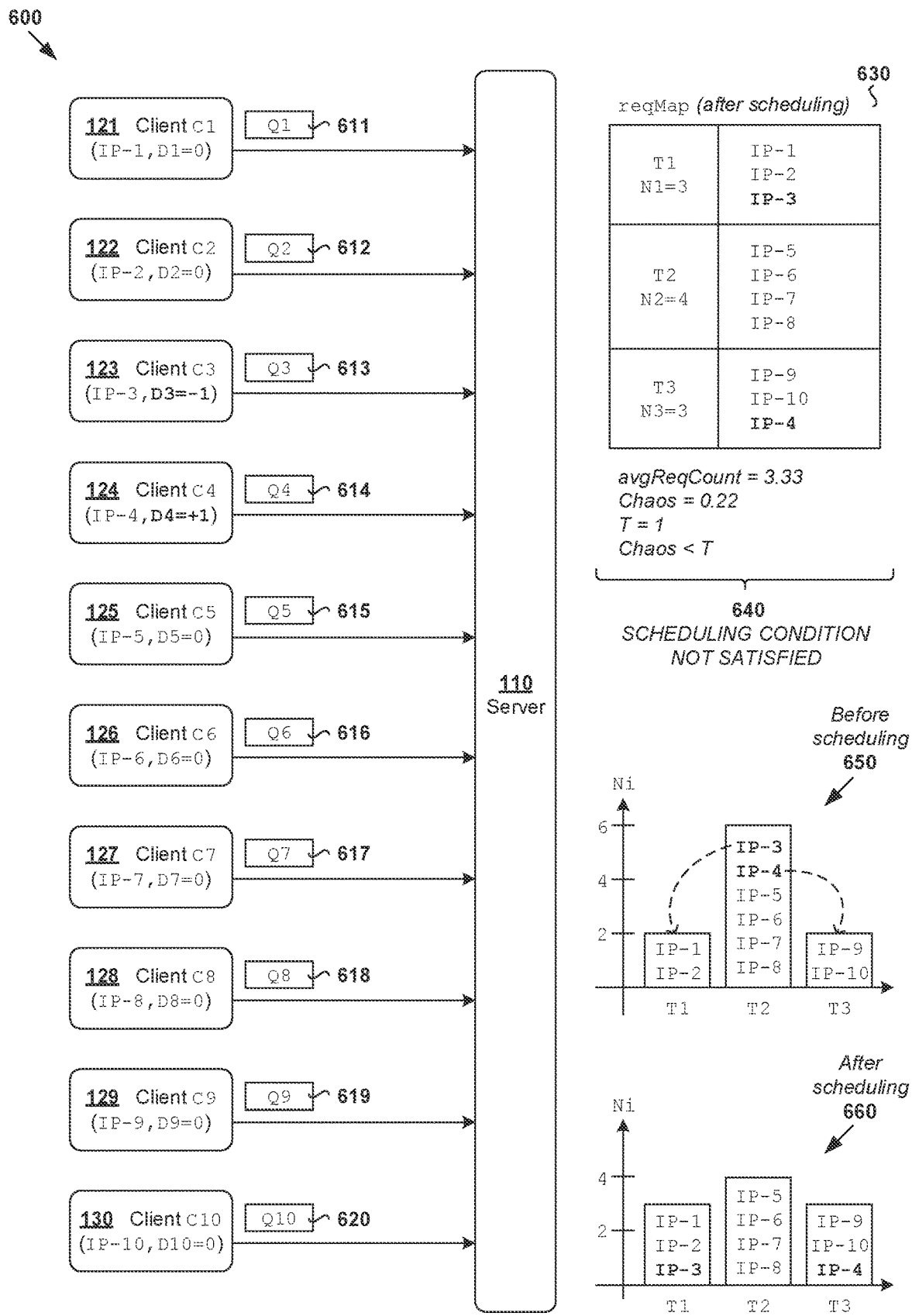
FIG. 6 is a schematic diagram illustrating second example of request handling with automatic scheduling.

FIG. 4 is a flowchart of example process 400 of request handling with automatic scheduling in SDN environment 100. Example process 400 may include one or more operations, functions, or actions illustrated at 405 to 485. The various operations, functions or actions may be combined into fewer blocks, divided into additional blocks, and/or eliminated depending on the desired implementation. The example in FIG. 4 will be explained using FIGS. 5-6. In particular, FIG. 5 is a schematic diagram illustrating first example 500 of request handling with automatic scheduling. FIG. 6 is a schematic diagram illustrating second example 600 of request handling with automatic scheduling.

In the following, consider a scenario where server 110 is configured to facilitate time-insensitive, automatic software component updates. There are K=10 client devices 121-130 interacting with server 110 to update a software component periodically. For example, after a new release is available on server 110, there is a requirement to update the software component within a predetermined time period, such as within n=3 minutes. From the perspective of server 110, three time slots may be allocated to handle software update requests from client devices 121-130. Each time slot (also referred to as a delta slot) may be one minute based on n=3 minutes. In practice, any suitable length of time slot may be used.

(a) First Set of Control Parameters

At 511-520 in FIG. 5, M=10 client devices 121-130 may generate and send respective software update requests (see "Q1" to "Q10") to server 110. In this example, client devices 121-130 are assigned with respective IP addresses denoted as "IP-1" to "IP-10." For the $k^{th}$ client device, request=Qk may be generated and sent based on a corresponding control parameter=Dk. For example, for a first software update cycle in FIG. 5, Dk=0 for all client devices 121-130 (where k=1, . . . , 10).

Depending on the desired implementation, client devices 121-130 may each run a component (e.g., daemon thread) that is configured to sleep for a period of time and wake up (e.g., at the same minute in different hours) to check for software update. An example is shown in blocks 405-430 in FIG. 4. First, at block 405, a counter is initialized to 60 seconds (e.g., count=60), and a control parameter to zero (e.g., Dk=0) for the $k^{th}$ client device. At blocks 410-415, the counter is decremented (e.g., count=count−1) and the daemon thread is put to sleep for 60 seconds (e.g., time.sleep (60)). At block 420-425, once a predetermined sleep time is reached (e.g., count<Dk), the counter may be reset (e.g., count=60). At block 430, a software update request (Qk) may be generated and sent towards server 110.

(b) Request Handling

At 530 in FIG. 5, server 110 may monitor various request characteristic(s) based on based on software update requests 511-520 (see "Q1" to "Q10") received from client devices 121-130. For example, server 110 may generate a request pattern or map (denoted as reqMap) to track the number of requests per time slot during one update cycle with n time slots:

reqMap={(Ti,Ni)}, where $i=1, \ldots, n$.

In the above example, Ti=the $i^{th}$ time slot and Ni=number of requests received at the $i^{th}$ time slot. For example, at a first time slot, (i=1, T1, N1=2) indicates that server 110 receives two requests (see "Q1" and "Q2") from client devices 121-122 assigned with respective IP addresses (IP-1, IP-2). At a second time slot, (i=2, T2, N2=6) indicates six requests (see "Q3" to "Q8") from client devices 123-128 assigned with respective (IP-3, IP-4, IP-5, IP-6, IP-7, IP-8). At a third time slot, (i=3, T3, N3=2) indicates two further requests (see "Q9" and "Q10") from client devices 129-130 assigned with respective (IP-9, IP-10).

Further, server 110 may determine an average request count denoted as avgReqCount=10/3=3.33 requests per minute. Next, a statistical parameter indicating a variance of the number of received requests. In probability theory and statistics, variance is the expectation of the squared deviation of a random variable from its mean. In practice, the variance (denoted as chaos) may be calculated as follows using n=number of time slots for one cycle, Ni=number of requests at the $i^{th}$ time slot and avgReqCount=average or mean number of requests during one cycle:

$$chaos = \frac{1}{n}\sum_{i=1}^{n}(Ni - avgReqCount)^2$$

At 540 in FIG. 5, server 110 may determine that an automatic scheduling condition is satisfied. For example, using n=3 time slots, N1=2, N2=6, N3=2 and avgReqCount=3.33 in FIG. 5, chaos=[(2−3.33)²+(6−3.33)²+(2−3.33)²]/3=3.56, which exceeds a predetermined threshold denoted as T=1. As such, it is determined that the automatic scheduling condition is satisfied (i.e., chaos>T). Otherwise, if the condition is not satisfied, server 110 may proceed to generate and send a response (Rk) to each client device as usual. See also blocks 435, 440, 441-443, 450 (no) and 455 in FIG. 4.

(c) Second Set of Control Parameters

At 550 in FIG. 5, server 110 may perform automatic scheduling by determining a seat map (denoted as seatMap) based on request map 530. The seat map may be defined as follows to track the number of "seat" (Si) available at a particular $i^{th}$ time slot:

seatMap={(Ti,Si)}, where $i=1, \ldots, n$.

Here, the number of seat (Si) may represent additional server capacity, such as the number of additional (if any) requests that may be handled by server 110 based on the request map (reqMap) of the current cycle. For example in FIG. 5, for i=1 and N1=2, (T1, S1=+1) indicates that server 110 has the capacity to handle one additional request during the first time slot. For i=2 and N2=6, (T2, S2=0) indicates that server 110 has no additional capacity during the second time slot. For i=3 and N3=2, (T3, S3=+1) indicates that server 110 may handle one additional request during the third time slot (i=3).

At 560 in FIG. 5, server 110 may perform automatic scheduling by determining a delta map (deltaMap) to assign a second set of control parameters (Dk*, where k=1, . . . , K) to respective K=10 client devices 121-130. The delta map may be assigned based on reqMap 530, seatMap 550 and avgReqCount. In practice, control parameter Dk may be referred to as a delta value assigned to the $k^{th}$ client. See corresponding blocks 460, 461-463 in FIG. 4.

For example, based on reqMap 530 in FIG. 5, N2=6 exceeds avgReqCount=3.33 at the second time slot (T2). Also, based on seatMap 550, server 110 is able to handle one additional request at both the first time slot (T1) and third time slot (T3). In this case, a control parameter (Dk*) may be assigned to shift at least one request from the second time slot (T2) to an earlier time slot (T1) or a later time slot (T3) slot relative to the start of the next update cycle ("reference time slot"). For each client device (Ck), the assigned control parameter (Dk*) may be one of the following:

(1) A negative value (Dk*<0) may be assigned to instruct the client (Ck) to decrease a sleep time of a client-side component (e.g., daemon thread) to send a subsequent request at an earlier time slot. For example in FIG. 5, a negative D3*=−1 is assigned to (client=C3 with IP address=IP-3) to instruct client device 123 to send a subsequent request to server 110 at one earlier time slot. See also block 420 in FIG. 4 where comparison (count>Dk) is performed. Compared with Dk=0, a (lower) negative value for Dk decreases the sleep time at block 415.

(2) A positive value (Dk*>0) may be assigned to instruct a client (Cj) to increase a sleep time of the daemon thread to send a subsequent request to server 110 at a later time slot. For example in FIG. 5, a positive D4*=+1 is assigned to (client=C4 with IP address=IP-4) to instruct client device 124 to delay sending a subsequent request to server 110 by one time slot. Again, see also block 420 in FIG. 4 where comparison (count>Dk) is performed. Compared with Dk=0, a (higher) positive value for Dk increases the sleep time at block 415.

(3) Otherwise, Dk*=0 may be assigned to instruct the client (Ck) to maintain the same sleep time of the daemon thread to send a subsequent request at the same time slot. For example in FIG. 5, Dk*=0 for all other client devices 121-122, 125-130 (i.e., k=1, 2 and k=5, . . . , 10).

At 571-580 in FIG. 5, server 110 may generate and send a response specifying the assigned control parameter (Dk*) to each client device (Ck) associated with destination IP address=IP-k. This is to instruct each client device (Ck) to generate and send a subsequent request based on the control parameter (Dk*) during a subsequent software update cycle. This also has the effect of modifying auto-update code on the client side to wake up at an earlier or later time. In response to receiving the response from server 110, each client device (Ck) may set Dk=Dk*, thereby replacing a delta value ("first control parameter") used in a previous cycle with another delta value ("second control parameter") that is assigned during automatic scheduling. See also blocks 475, 480 (yes) and 485 in FIG. 4.

(d) Modified Request Characteristic(s)

Referring now to FIG. 6, at 611-620, client devices 121-130 may generate and send subsequent software update requests (see "Q1" to "Q10") to server 110 based on the second set of control parameters (Dk*). Based on requests 611-620, server 110 may monitor any of the following request characteristic(s): request map (regMap), average number of requests per time slot (avgReqCount) and variance of number of requests (chaos), etc. See blocks 440-443 in FIG. 4.

At 630 in FIG. 6, server 110 may determine a request map (regMap) to track the number of requests over n time slot. Here, at a first time slot, (T1, N1=3) indicates that server 110 receives three requests (see "Q1" to "Q3") from respective IP addresses (IP-1, IP-2, IP-3). At a second time slot, (T2, N2=4) indicates four requests (see "Q5" to "Q8") from respective (IP-5, IP-6, IP-7, IP-8). At a third time slot, (T3, N3=3) indicates three requests (see "Q9," "Q10" and "Q4") from respective (IP-9, IP-10, IP-4).

At 640 in FIG. 6, server 110 may determine whether a scheduling condition is satisfied based on a chaos parameter associated with updated regMap 630. In particular, using n=3 time slots, N1=3, N2=4, N3=3 and avgReqCount=3.33, chaos=$[(3-3.33)^2+(4-3.33)^2+(3-3.33)^2]/3$=0.22, which is less that the predetermined threshold T=1. As such, it is determined that the scheduling condition is not satisfied for the current cycle.

At 650 and 660 in FIG. 6, the second set of control parameters has the effect of modifying request characteristic(s) being monitored by server 110, such as by reducing the peak number of requests and/or variance (chaos). Prior to automatic scheduling (see 650), a spike of requests with peak demand=6 requests and chaos=3.56 may be observed during the second time slot (T2), which may lead to a bottleneck and performance degradation at server 110.

In contrast, after automatic scheduling (see 660), reduced peak demand=4 requests and chaos=0.22 may be observed. In other words, examples of the present disclosure may be implemented to reduce the peak demand and achieve a more evenly distributed request pattern (reqMap) by shifting requests to other time slots. Instead of scaling up server 110 by increasing its workload capacity (e.g., add memory and processing power), server 110 may instruct client devices 121-130 to adjust their behavior using control parameters assigned by server 110.

Adapting to Changing Client Population

Figure 7:
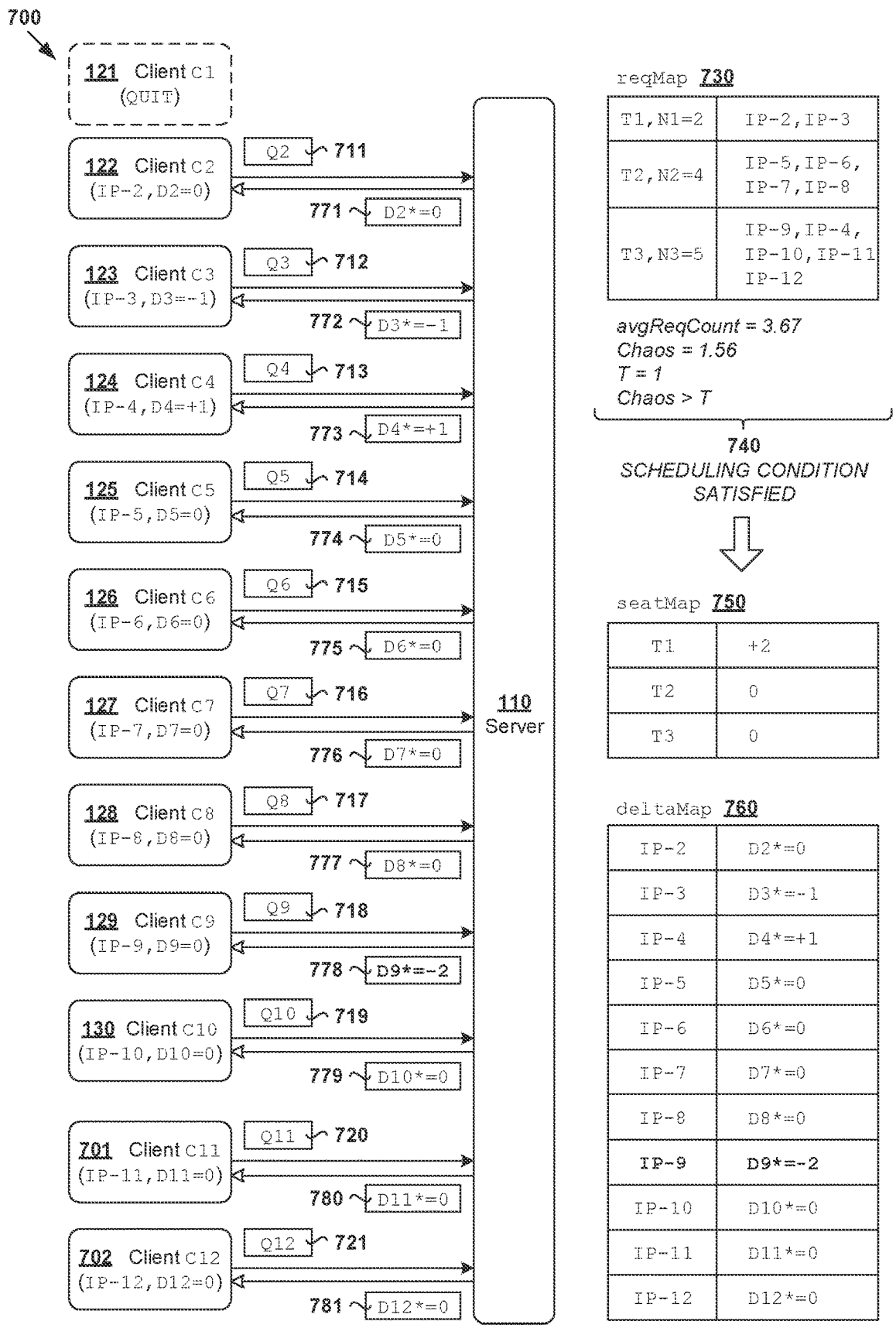
FIG. 7 is a schematic diagram illustrating third example of request handling with automatic scheduling.
Figure 8:
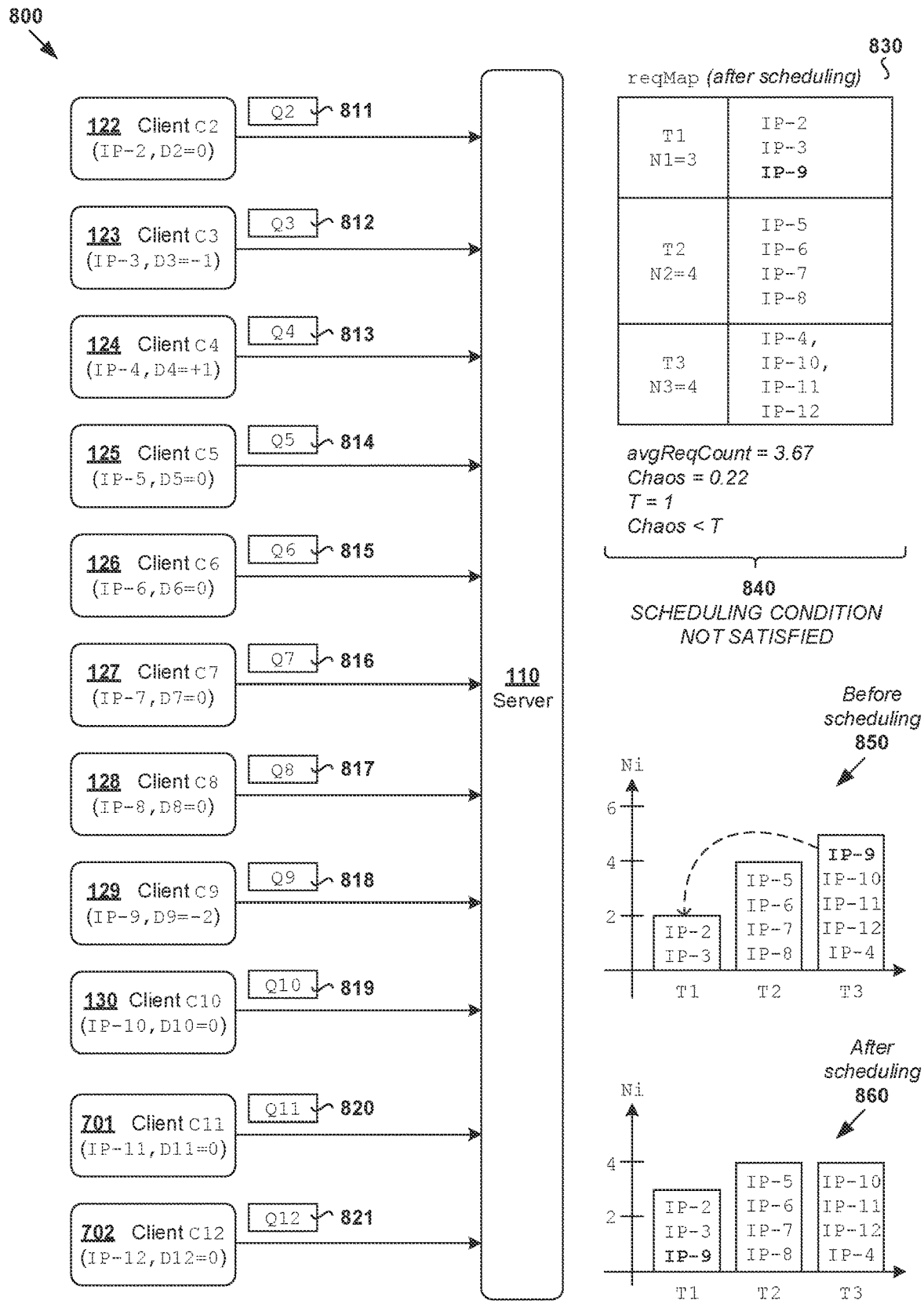
FIG. 8 is a schematic diagram illustrating fourth example of request handling with automatic scheduling.

Examples of the present disclosure may be implemented to adapt to changing client population and varying request patterns. Some examples will be explained using FIGS. 7-8. In particular, FIG. 7 is a schematic diagram illustrating third example 700 of request handling with automatic scheduling. FIG. 8 is a schematic diagram illustrating fourth example 800 of request handling with automatic scheduling.

(a) Automatic Scheduling

Referring first to FIG. 7, consider a scenario where one client device 121 leaves and two additional client devices 701-702. In this case, server 110 may monitor request characteristic(s) based on requests 711-721 in the current software update cycle. For example, at 730, server 110 may determine a request map specifying (T1, N1=2) for a first time slot, (T2, N2=4) for a second time slot and (T3, N3=5) for a third time slot. As such, based on requests 711-721, the request map indicates that, during the third time slot (T3), the number of requests (N3=5) exceeds an average number of avgReqCount=3.67. Further, at 740, server 110 may determine the automatic scheduling condition based on chaos=1.56 exceeding threshold T=1.

At 750 in FIG. 7, server 110 may perform automatic scheduling by determining a seat map (seatMap) based on reqMap 730. In particular, (T1, S1=+2) for the first time slot with N1=2 requests, which indicates that there is available capacity for request handling (e.g., two "seats" available). Also, (T2, S2=0) for the second time slot and (T3, N3=0) for the third time slot. Since N3=5>avgReqCount=3.67 based on reqMap 730, one request may be shifted from the third time slot (T3) to an earlier time slot with (T1, S1=+2).

At 760 in FIG. 7, server 110 may determine a delta map (deltaMap) that includes D9*=−2 to instruct client device 129 to generate and send a subsequent request at an earlier time slot, particularly T1 instead of T3. Further, at 771-781, responses are generated and sent to respective client devices 122-130, 701-702. According to blocks 415-420 FIG. 4, D9*=−2 decreases a sleep time of a daemon thread running on client device 129.

(b) Modified Request Characteristic(s)

Referring now to FIG. 8, at 811-821, client devices 121-130, 701-702 may generate and send subsequent software update requests (see "Q1" to "Q12") to server 110. Based on requests 811-821, server 110 may monitor various request characteristics: request map (reqMap), average number of requests per time slot (avgReqCount) and variance of number of requests (chaos), etc.

At 830 in FIG. 8, server 110 may track the number of requests over n time slot using reqMap. Here, at a first time slot, (T1, N1=3) indicates three requests from respective (IP-2, IP-3, IP-9). At a second time slot, (T2, N2=4) indicates four requests from respective (IP-5, IP-6, IP-7, IP-8). At a third time slot, (T3, N3=4) indicates four requests from respective (IP-10, IP-11, IP-12, IP-4). Compared to the previous cycle in FIG. 7, note that a request is received from client device 129 at the first time slot (T1) instead of the third time slot (T3) in the current cycle.

At 840 in FIG. 8, server 110 may determine a variance associated with updated reqMap 830. In particular, using n=3 time slots, N1=3, N2=4, N3=3 and avgReqCount=3.33, chaos=$[(3-3.33)^2+(4-3.33)^2+(3-3.33)^2]/3=0.22$, which is less that the predetermined threshold T=1. As such, it is determined that the scheduling condition is not satisfied for the current cycle because the requests are now more evenly distributed over the time slots.

At 850 in FIG. 8, prior to automatic scheduling in FIG. 7, a spike of requests with peak demand=5 requests and chaos=1.56 may be observed during the third time slot (T3). In contrast, after automatic scheduling, a reduced peak demand=4 requests and chaos=0.22 may be observed at 860. As such, examples of the present disclosure may be implemented to reduce the peak demand and variance to reduce spikes and achieve a more evenly distributed request pattern (reqMap) by influencing client device(s) to shift requests to other time slots.

Other implementation details discussed using FIGS. 4-6 are also applicable here and will not be repeated for brevity. In practice, note that server 110 may be configured to handle hundreds, if not thousands, of requests at every cycle.

Container Implementation

Although explained using VMs 231-234, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 231-234. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform request handling with automatic scheduling, wherein the method comprises:

receiving, from multiple client devices, respective multiple requests that are generated and sent according to a first set of control parameters, wherein the first set includes a first control parameter assigned to a particular client device from the multiple client devices;

based on the multiple requests, monitoring one or more request characteristics to determine whether an automatic scheduling condition is satisfied; and in response to determination that the automatic scheduling condition is satisfied, assigning a second set of control parameters to the respective client devices, wherein the second set includes a second control parameter that is assigned to the particular client device and different from the first control parameter; and instructing the client devices to generate and send respective multiple subsequent requests according to the second set of control parameters to cause a modification of the one or more request characteristics.

2. The method of claim 1, wherein monitoring the one or more request characteristics comprises:

monitoring at least one of the following: (a) a variance of number of requests received over a period of time; (b) an average number of requests received over a period of time and (c) a peak number of requests received over a period of time.

3. The method of claim 1, wherein assigning the second set of control parameters comprises:

assigning the second control parameter to cause the particular client device to generate and send a subsequent request at an earlier time slot or a later time slot relative to a reference time slot.

4. The method of claim 3, wherein assigning the second set of control parameters comprises:

assigning the second control parameter to cause the particular client device to decrease a sleep time of a daemon to generate and send the subsequent request at the earlier time slot relative to the reference time slot.

5. The method of claim 3, wherein assigning the second set of control parameters comprises:

assigning the second control parameter to cause the particular client device to increase a sleep time of a daemon to generate and send the subsequent request at the later time slot relative to the reference time slot.

6. The method of claim 3, wherein assigning the second set of control parameters comprises:

based on the multiple first requests, determining a request map indicating that, during a first time slot, a number of received requests exceeds an average number;

determining a seat map indicating that there is available capacity for request handling during a second time slot; and based on the request map and the seat map, assigning the second control parameter to cause the particular client device to generate and send the subsequent request at the second time slot instead of the first time slot.

7. The method of claim 1, wherein the method further comprises:

receiving, from the client devices, the respective multiple subsequent requests that are generated and sent according to the second set of control parameters; and based on the multiple subsequent requests, detecting the modification of the one or more request characteristics, wherein the modification includes a reduction in a variance of number of requests or a reduction of peak number of requests.

8. A non-transitory computer-readable storage medium that includes a set of instructions which, in response to execution by a processor of a computer system, cause the processor to perform a method of request handling with automatic rescheduling, wherein the method comprises:

receiving, from multiple client devices, respective multiple requests that are generated and sent according to a first set of control parameters, wherein the first set includes a first control parameter assigned to a particular client device from the multiple client devices;

based on the multiple requests, monitoring one or more request characteristics to determine whether an automatic scheduling condition is satisfied; and in response to determination that the automatic scheduling condition is satisfied, assigning a second set of control parameters to the respective client devices, wherein the second set includes a second control parameter that is assigned to the particular client device and different from the first control parameter; and instructing the client devices to generate and send respective multiple subsequent requests according to the second set of control parameters to cause a modification of the one or more request characteristics.

9. The non-transitory computer-readable storage medium of claim 8, wherein monitoring the one or more request characteristics comprises:

monitoring at least one of the following: (a) a variance of number of requests received over a period of time; (b) an average number of requests received over a period of time and (c) a peak number of requests received over a period of time.

10. The non-transitory computer-readable storage medium of claim 8, wherein assigning the second set of control parameters comprises:

assigning the second control parameter to cause the particular client device to generate and send a subsequent request at an earlier time slot or a later time slot relative to a reference time slot.

11. The non-transitory computer-readable storage medium of claim 10, wherein assigning the second set of control parameters comprises:

assigning the second control parameter to cause the particular client device to decrease a sleep time of a daemon to generate and send the subsequent request at the earlier time slot relative to the reference time slot.

12. The non-transitory computer-readable storage medium of claim 10, wherein assigning the second set of control parameters comprises:

assigning the second control parameter to cause the particular client device to increase a sleep time of a daemon to generate and send the subsequent request at the later time slot relative to the reference time slot.

13. The non-transitory computer-readable storage medium of claim 10, wherein assigning the second set of control parameters comprises:

based on the multiple first requests, determining a request map indicating that, during a first time slot, a number of received requests exceeds an average number;

determining a seat map indicating that there is available capacity for request handling during a second time slot; and based on the request map and the seat map, assigning the second control parameter to cause the particular client device to generate and send the subsequent request at the second time slot instead of the first time slot.

14. The non-transitory computer-readable storage medium of claim 8, wherein the method further comprises:

receiving, from the client devices, the respective multiple subsequent requests that are generated and sent according to the second set of control parameters; and based on the multiple subsequent requests, detecting the modification of the one or more request characteristics, wherein the modification includes a reduction in a variance of number of requests or a reduction of peak number of requests.

15. A computer system, comprising:
(a) an interface to receive, from multiple client devices, respective multiple requests that are generated and sent according to a first set of control parameters, wherein the first set includes a first control parameter assigned to a particular client device from the multiple client devices; and
(b) an automatic scheduler to perform the following:
based on the multiple requests, monitor one or more request characteristics to determine whether an automatic scheduling condition is satisfied; and
in response to determination that the automatic scheduling condition is satisfied,
assign a second set of control parameters to the respective client devices, wherein the second set includes a second control parameter that is assigned to the particular client device and different from the first control parameter; and
instruct the client devices to generate and send respective multiple subsequent requests according to the second set of control parameters to cause a modification of the one or more request characteristics.

16. The computer system of claim 15, wherein monitoring the one or more request characteristics comprises the automatic scheduler performing the following:
monitor at least one of the following: (a) a variance of number of requests received over a period of time; (b) an average number of requests received over a period of time and (c) a peak number of requests received over a period of time.

17. The computer system of claim 15, wherein assigning the second set of control parameters comprises the automatic scheduler performing the following:
assign the second control parameter to cause the particular client device to generate and send a subsequent request at an earlier time slot or a later time slot relative to a reference time slot.

18. The computer system of claim 17, wherein assigning the second set of control parameters comprises the automatic scheduler performing the following:
assign the second control parameter to cause the particular client device to decrease a sleep time of a daemon to generate and send the subsequent request at the earlier time slot relative to the reference time slot.

19. The computer system of claim 17, wherein assigning the second set of control parameters comprises the automatic scheduler performing the following:
assign the second control parameter to cause the particular client device to increase a sleep time of a daemon to generate and send the subsequent request at the later time slot relative to the reference time slot.

20. The computer system of claim 17, wherein assigning the second set of control parameters comprises the automatic scheduler performing the following:
based on the multiple first requests, determine a request map indicating that, during a first time slot, a number of received requests exceeds an average number;
determine a seat map indicating that there is available capacity for request handling during a second time slot; and
based on the request map and the seat map, assign the second control parameter to cause the particular client device to generate and send the subsequent request at the second time slot instead of the first time slot.

21. The computer system of claim 15, wherein:
(a) the interface is further to receive, from the client devices, the respective multiple subsequent requests that are generated and sent according to the second set of control parameters; and
(b) the automatic scheduler is further to detect the modification of the one or more request characteristics based on the multiple subsequent requests, wherein the modification includes a reduction in a variance of number of requests or a reduction of peak number of requests.

* * * * *